United States Patent
Yang et al.

(10) Patent No.: US 11,429,175 B1
(45) Date of Patent: Aug. 30, 2022

(54) PREVENTING AN OPERABLE STATE IN AN INFORMATION HANDLING SYSTEM IN RESPONSE TO A RESET OF A POWER SUPPLY

(71) Applicant: Dell Products L.P., Round Rock, TX (US)

(72) Inventors: Cheng-Hung Yang, Taipei (TW); Ching-Yuan Chuang, New Taipei (TW); Feng-Hsing Chiang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/405,846

(22) Filed: Aug. 18, 2021

(51) Int. Cl.
| | | |
|---|---|---|
| *G06F 1/32* | (2019.01) | |
| *G06F 1/26* | (2006.01) | |
| *G06F 1/30* | (2006.01) | |
| *G06F 1/3206* | (2019.01) | |
| *G06F 1/3287* | (2019.01) | |

(52) U.S. Cl.
CPC .............. *G06F 1/3206* (2013.01); *G06F 1/30* (2013.01); *G06F 1/3287* (2013.01); *G06F 1/266* (2013.01)

(58) Field of Classification Search
CPC ...... G06F 1/3206; G06F 1/3287; G06F 1/266; G06F 1/30
See application file for complete search history.

(56) References Cited

U.S. PATENT DOCUMENTS

| | | | | |
|---|---|---|---|---|
| 4,951,171 | A * | 8/1990 | Tran | .......................... G06F 1/30 |
| | | | | 714/E11.005 |
| 5,850,156 | A * | 12/1998 | Wittman | .............. H03K 17/145 |
| | | | | 327/143 |
| 9,898,308 | B2 * | 2/2018 | Park | ...................... G06F 1/3218 |
| 2008/0222439 | A1 * | 9/2008 | Lin | .......................... G06F 1/30 |
| | | | | 713/340 |

* cited by examiner

*Primary Examiner* — Stefan Stoynov
(74) *Attorney, Agent, or Firm* — Baker Botts, L.L.P.

(57) ABSTRACT

In one embodiment, a method for preventing an operable state in a plurality of components of an information handling system in response to a reset of a power supply includes: receiving, by an embedded controller of the information handling system, power from the power supply after the reset of the power supply; causing a platform controller hub of the information handling system to receive the power from the power supply; receiving a signal from the platform controller hub indicating that the plurality of components should be placed in the operable state from an inoperable state; determining that the reset of the power supply was caused by the power supply being previously removed from the information handling system; determining that a position of a lid of the information handling system is in a closed position; and causing the plurality of components to remain in the inoperable state.

20 Claims, 3 Drawing Sheets

```
┌─────────────────────────────────────────────────────────────┐
│ RECEIVE, BY AN EMBEDDED CONTROLLER (EC), POWER FROM         │
│ A POWER SUPPLY.                                             │
│ 310                                                         │
└─────────────────────────────────────────────────────────────┘
                              │
                              ▼
┌─────────────────────────────────────────────────────────────┐
│ CAUSE, BY THE EC, A PLATFORM CONTROLLER HUB (PCH) TO RECEIVE│
│ THE POWER FROM THE POWER SUPPLY.                            │
│ 320                                                         │
└─────────────────────────────────────────────────────────────┘
                              │
                              ▼
┌─────────────────────────────────────────────────────────────┐
│ RECEIVE, BY THE EC, A PCH SIGNAL INDICATING THAT A PLURALITY OF │
│ COMPONENTS SHOULD BE PLACED IN AN OPERABLE STATE.           │
│ 330                                                         │
└─────────────────────────────────────────────────────────────┘
                              │
                              ▼
┌─────────────────────────────────────────────────────────────┐
│ DETERMINE, BY THE EC, THAT A RESET OF THE POWER SUPPLY WAS  │
│ CAUSED BY THE POWER SUPPLY BEING PREVIOUSLY REMOVED.        │
│ 340                                                         │
└─────────────────────────────────────────────────────────────┘
                              │
                              ▼
┌─────────────────────────────────────────────────────────────┐
│ DETERMINE, BY THE EC, THAT A POSITION OF A LID IS IN        │
│ A CLOSED POSITION.                                          │
│ 350                                                         │
└─────────────────────────────────────────────────────────────┘
                              │
                              ▼
┌─────────────────────────────────────────────────────────────┐
│ CAUSE, BY THE EC, THE PLURALITY OF COMPONENTS TO REMAIN     │
│ IN THE INOPERABLE STATE.                                    │
│ 360                                                         │
└─────────────────────────────────────────────────────────────┘
```

FIG. 3

PREVENTING AN OPERABLE STATE IN AN INFORMATION HANDLING SYSTEM IN RESPONSE TO A RESET OF A POWER SUPPLY

BACKGROUND

Field of the Disclosure

The disclosure relates generally to information handling systems, and in particular to preventing an operable state in an information handling system in response to a reset of a power supply.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed method for preventing an operable state in a plurality of components of an information handling system in response to a reset of a power supply includes: receiving, by an embedded controller (EC) of the information handling system, power from the power supply after the reset of the power supply; causing, by the EC, a platform controller hub (PCH) of the information handling system to receive the power from the power supply; receiving, by the EC, a PCH signal from the PCH indicating that the plurality of components should be placed in the operable state from an inoperable state; determining, by the EC, that the reset of the power supply was caused by the power supply being previously removed from the information handling system; determining, by the EC, that a position of a lid of the information handling system is in a closed position; and causing, by the EC, the plurality of components to remain in the inoperable state.

In one or more of the disclosed embodiments, the method further includes: determining, by the EC, that the position of the lid has changed from the closed position to an open position; sending, by the EC, an EC signal to the PCH confirming that the plurality of components should be placed in the operable state; and causing, by the EC, a first portion of the plurality of components to be placed in the operable state.

In one or more of the disclosed embodiments, the method further includes: receiving, by the PCH, the EC signal confirming that the plurality of components should be placed in the operable state; and causing, by the PCH, a second portion of the plurality of components to be placed in the operable state.

In one or more of the disclosed embodiments, determining that the position of the lid has changed from the closed position to the open position includes: receiving, by the EC, a sensor signal from a sensor of the information handling system, the sensor signal indicating that the position of the lid is in the open position.

In one or more of the disclosed embodiments, causing the plurality of components to remain in the inoperable state includes: refraining, by the EC, from sending an EC signal to the PCH confirming that the plurality of components should be placed in the operable state; and refraining, by the EC, from causing a first portion of the plurality of components to be placed in the operable state.

In one or more of the disclosed embodiments, the method further includes: waiting, by the PCH, for a threshold time period to receive the EC signal confirming that the plurality of components should be placed in the operable state; identifying, by the PCH, that the threshold time period has elapsed; and refraining, by the PCH, from causing a second portion of the plurality of components to be placed in the operable state.

In one or more of the disclosed embodiments, determining that the position of the lid is in the closed position includes: receiving, by the EC, a sensor signal from a sensor of the information handling system, the sensor signal indicating that the position of the lid is in the closed position.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This document describes a method for preventing an operable state in a plurality of components of an information handling system in response to a reset of a power supply includes: receiving, by an embedded controller (EC) of the information handling system, power from the power supply after the reset of the power supply; causing, by the EC, a platform controller hub (PCH) of the information handling system to receive the power from the power supply; receiving, by the EC, a PCH signal from the PCH indicating that the plurality of components should be placed in the operable state from an inoperable state; determining, by the EC, that the reset of the power supply was caused by the power supply being previously removed from the information handling system; determining, by the EC, that a position of a lid of the information handling system is in a closed position; and causing, by the EC, the plurality of components to remain in the inoperable state.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Figure 1:
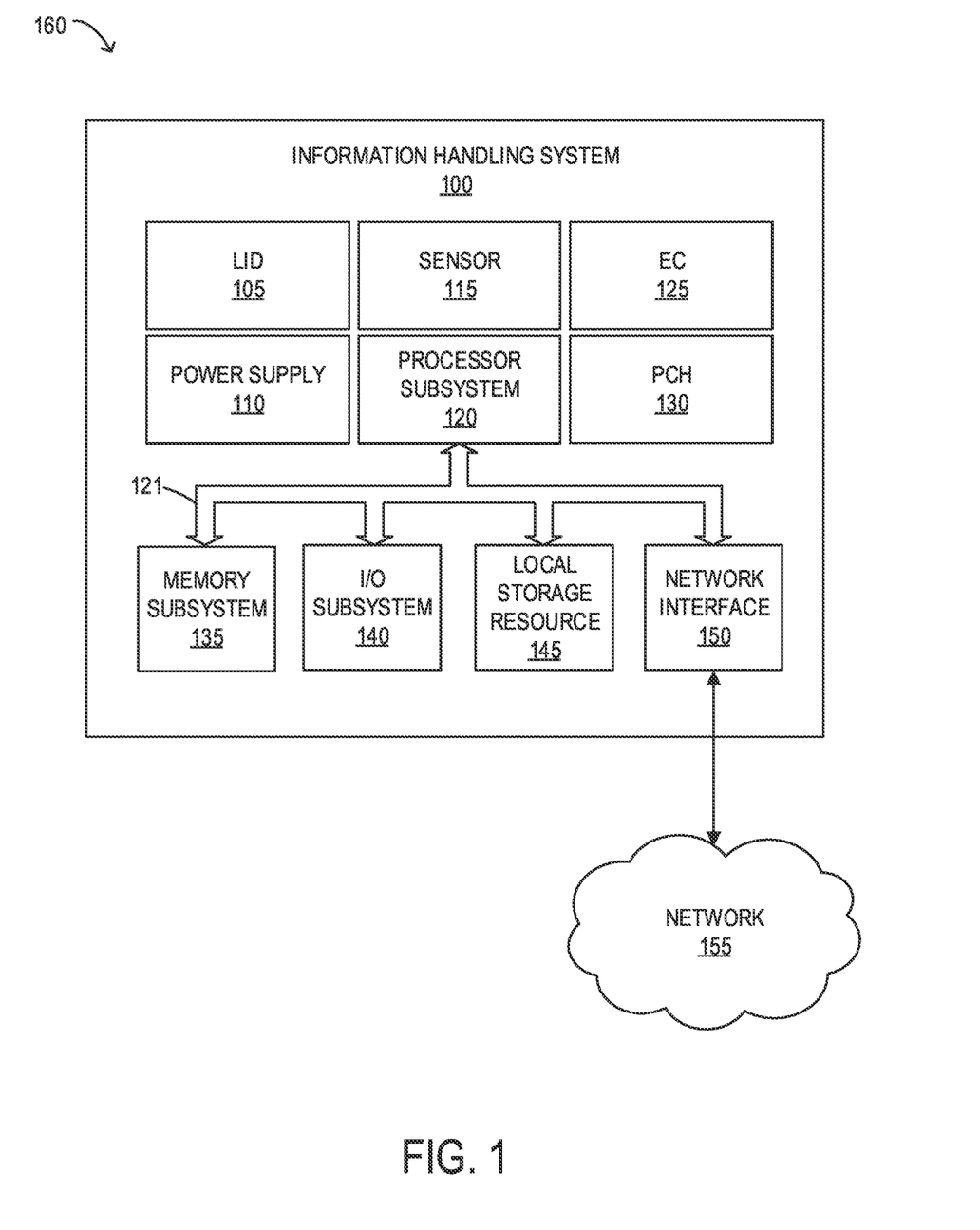
FIG. 1 is a block diagram of selected elements of an embodiment of a computing environment that includes an information handling system.
Figure 2:
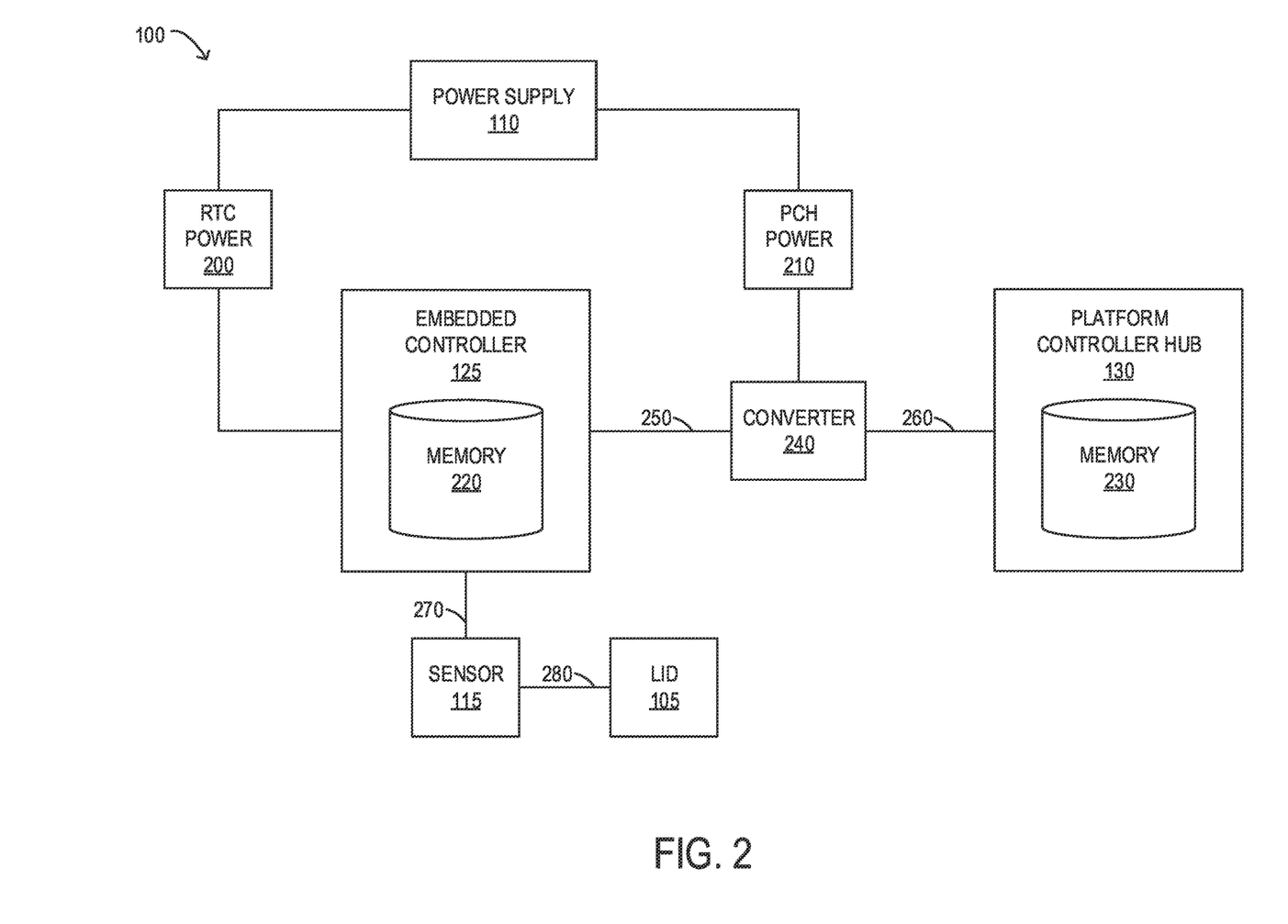
FIG. 2 illustrates selected elements of an embodiment of an information handling system.
Figure 3:
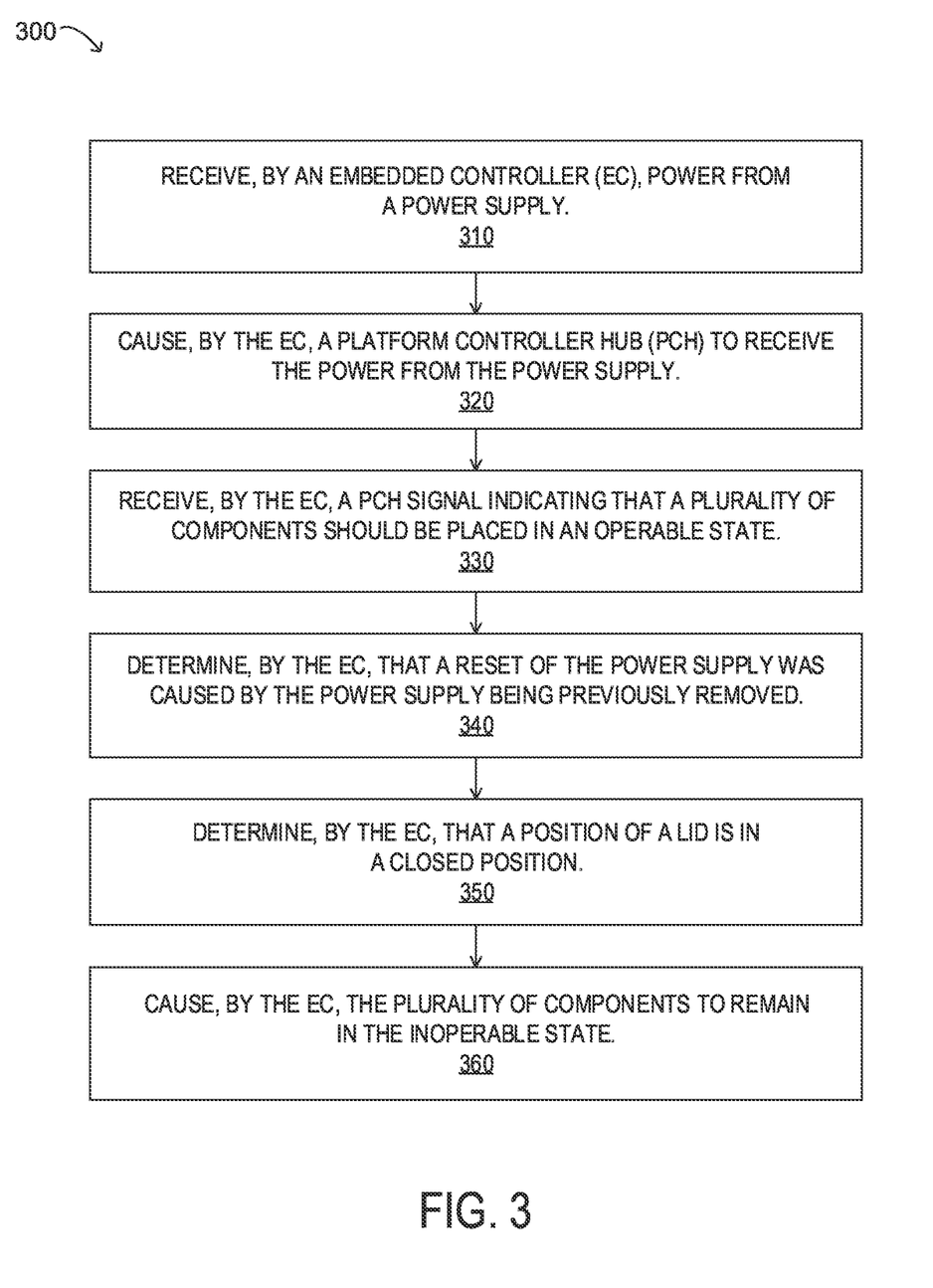
FIG. 3 is a flowchart depicting selected elements of an embodiment of a method for preventing an operable state in a plurality of components of an information handling system in response to a reset of a power supply.

Particular embodiments are best understood by reference to FIGS. 1-3 wherein like numbers are used to indicate like and corresponding parts.

Turning now to the drawings, FIG. 1 is a block diagram of selected elements of an embodiment of a computing environment that includes an information handling system. Specifically, FIG. 1 illustrates a block diagram depicting selected elements of an information handling system 100 in accordance with some embodiments of the present disclosure. In other embodiments, information handling system 100 may represent different types of portable information handling systems, such as, display devices, head mounted displays, head mount display systems, smart phones, tablet computers, notebook computers, media players, foldable display systems, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems.

In the embodiment illustrated in FIG. 1, components of information handling system 100 may include, but are not limited to, a processor subsystem 120, which may comprise one or more processors, and system bus 121 that communicatively couples various system components to processor subsystem 120 including, for example, a memory subsystem 135, an I/O subsystem 140, a local storage resource 145, and a network interface 150. System bus 121 may represent a variety of suitable types of bus structures (e.g., a memory bus, a peripheral bus, or a local bus) using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express (PCIe) bus, HyperTransport (HT) bus, and Video Electronics Standards Association (VESA) local bus. As shown in FIG. 1, information handling system 100 may additionally include a lid 105, a power supply 110, a sensor 115, an embedded controller (EC) 125, and a platform controller hub (PCH) 130. In other embodiments, computing environment 160 may include additional, fewer, and/or different components than the components shown in FIG. 1.

In information handling system 100, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 135 and/or another component of information handling system 100). In the same or alternative embodiments, processor subsystem 120 may interpret and/or execute program instructions and/or process data stored remotely. In one embodiment, processor subsystem 120 may be or include a multi-core processor comprised of one or more processing cores disposed upon an integrated circuit (IC) chip. In other embodiments, processor subsystem 120 may be or include an integrated device (e.g., microcontroller, system on a chip (SoC), and the like) that includes memory, peripheral interfaces, and/or other components suitable for interpreting and/or executing program instructions and/or processing data.

In one embodiment, memory subsystem 135 may comprise a system, device, or apparatus operable to retain and/or retrieve program instructions and/or data for a period of time (e.g., computer-readable media). Memory subsystem 135 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In one embodiment, I/O subsystem 140 may comprise a system, device, or apparatus generally operable to receive and/or transmit data to, from, and/or within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

In one embodiment, local storage resource 145 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

In one embodiment, network interface 150 may be a suitable system, apparatus, or device operable to serve as an interface between information handling system 100 and a network 155. Network interface 150 may enable information handling system 100 to communicate over network 155 using a suitable transmission protocol and/or standard, including, but not limited to, transmission protocols and/or standards enumerated below with respect to the discussion of network 155. Network 155 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 150 may enable wired and/or wireless communications (e.g., NFC or Bluetooth) to and/or from information handling system 100.

In particular embodiments, network 155 may include one or more routers for routing data between client information handling systems 100 and server information handling systems 100. A device (e.g., a client information handling system 100 or a server information handling system 100) on network 155 may be addressed by a corresponding network address including, for example, an Internet protocol (IP) address, an Internet name, a Windows Internet name service (WINS) name, a domain name or other system name. In particular embodiments, network 155 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

In one embodiment, network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof.

In one embodiment, lid 105 may be a suitable system, apparatus, or device operable to house components of information handling system 100. In particular, lid 105 may be comprised of a rigid material (e.g., aluminum) and/or semi-rigid material (e.g., plastic) operable to provide a housing for components within information handling system 100. In one embodiment, lid 105 may be or include a top cover, or "A cover," for information handling system 100. In other embodiments, lid 105 may be or include a bottom cover, or "D cover," and/or any other cover or shell suitable for housing components of information handling system 100. Lid 105 is described in further detail with respect to FIG. 2.

In one embodiment, power supply 110 may be a suitable system, apparatus, or device operable to supply, or otherwise provide, power to information handling system 100. In particular, power supply 110 may be or include a battery operable to supply, or otherwise provide, power to components within information handling system 100 such that the components may become initialized, or be placed into an "operable state." That is, power supply 110 may supply power to components within information handling system 100 such that information handling system 100 may be operable for use for a finite time period (e.g., several hours) without requiring external power being supplied via a power cord coupled to a power outlet. In one embodiment, power supply 110 may be or include a battery comprised of nickel cadmium. In other embodiments, power supply 110 may be or include a battery comprised of nickel metal hydride, lithium ion, and/or any other type of battery suitable for supplying, or otherwise providing, power to information handling system 100. Power supply 110 is described in further detail with respect to FIG. 2.

In one embodiment, sensor 115 may be a suitable system, apparatus, or device operable to sense, or otherwise detect, a position of lid 105. Specifically, sensor 115 may be or include a device operable to detect the position, and/or changes in the position, of lid 105 in relation to information handling system 100. In one embodiment, sensor 115 may detect the position of lid 105 as being in an open position. For example, sensor 115 may detect that the position of lid 105 is in an open position as a user opens lid 105 of information handling system 100 to view information presented to the user via a display (not shown in figure) of information handling system 100. In another embodiment, sensor 115 may detect the position of lid 105 as being in a closed position. For example, sensor 115 may detect that the position of lid 105 is in a closed position as the user closes lid 105 of information handling system 100 at the end of a user session. In another example, sensor 115 may detect that the position of lid 105 is in the closed position during instances in which power supply 110 has been removed from information handling system 100 allowing a user and/or administrator to perform maintenance on components within information handling system 100.

In one embodiment, sensor 115 may be or include a Hall effect sensor operable to detect the presence and/or magnitude of a magnetic field within lid 105. In this embodiment, sensor 115 may detect a presence of a magnetic field caused by a magnet within lid 105 and may determine that lid 105 is in a closed position given the presence of the magnetic field. For example, sensor 115 may detect the presence of a magnetic field caused by a magnet within lid 105 when the position of lid 105 is at an angle of less than 50° in relation to information handling system 100. Similarly, sensor 115 may detect an absence of a magnetic field caused by the magnet within lid 105 and may determine that lid 105 is in an open position given the absence of the magnetic field. For example, sensor 115 may detect the absence of a magnetic field caused by the magnet within lid 105 when the position of lid 105 is at an angle greater than 50° in relation to information handling system 100. In another embodiment, sensor 115 may be or include a proximity sensor (e.g., inductive proximity sensor, capacitive proximity sensor, and the like) operable to detect the position of lid 105. In other embodiments, sensor 115 may be or include a magnetic proximity sensor, an ultrasound proximity sensor, a photo-electric proximity sensor, and/or any other type of sensor operable for sensing, or otherwise detecting, a position of lid 105. Sensor 115 is described in further detail with respect to FIG. 2.

In one embodiment, embedded controller (EC) 125 may be a suitable system, apparatus, or device operable to support various system tasks on behalf of information handling system 100. In particular, EC 125 may be or include an electronic hardware device (e.g. a microcontroller) operable to perform hardware initialization during a pre-boot sequence of information handling system 100 and to identify any failures or issues that may occur during initialization. In one embodiment, EC 125 may execute firmware instructions (e.g., stored in memory 220 shown in FIG. 2) that allows EC 125 to generate a diagnostic testing sequence used to detect, examine, and/or initialize components within, or communicably coupled to, information handling system 100. For example, EC 125 may power on after receiving power from power supply 110 after a reset of power supply 110 and may determine that the reset was caused by power supply 110 being previously removed from information handling system 100 by a user.

Conventionally, a reset of a power supply caused by a previous removal of the power supply from an information handling system may cause an EC to begin initializing components within, or communicably coupled to, the information handing system. However, for instances in which a user has removed the power supply to perform maintenance on components within the information handling system, the replacement of the battery within the information handling system may cause unexpected behavior as the EC receives power and begins to initialize the components. In particular, if the user has kept the position of the lid of the information handling system in a closed position and has oriented the information handling system in an orientation to best perform maintenance (e.g., an upside-down orientation), the user may be unaware of the EC initializing the components after the reset of the power supply. While the information handling system is in this orientation, the user may install and/or uninstall one or more components while performing maintenance which may unknowingly result in a short circuit causing damage to the information handling system, thereby decreasing overall system performance and user experience.

In contrast, EC 125 may receive power from power supply 110 after a reset of power supply 110 and may determine that the reset was caused by power supply 110 being previously removed from information handling system 100. Additionally, EC 125 may determine that a position of lid 105 is in a closed position. Upon determining that the reset was caused by power supply 110 being previously removed from information handling system 100 and that the position of lid 105 is in the closed position, EC 125 may determine that information handling system 100 is likely oriented in an upside-down orientation allowing a user to perform maintenance on components within information handling system 100 and that the user is likely unaware of the reset of power supply 110. Thus, EC 125 may delay the initialization of components within information handling system 100 to avoid the potential damage to information handling system 100 described above. Specifically, EC 125 may cause components within information handling system 100 to remain uninitialized, or in an "inoperable state," until EC 125 determines that the position of lid 105 is in an open position, thereby indicating that the user has explicitly enabled information handling system 100 for use. As such, EC 125 may avoid damages to information handling system 100 caused by an inadvertent reset of power supply 110, thereby increasing overall system performance and user experience. EC 125 is described in further detail with respect to FIG. 2.

In one embodiment, platform controller hub (PCH) 130 may be a suitable system, apparatus, or device operable to manage various data paths and functions associated with information handling system 100. In particular, PCH 130 may support general-purpose input/output (GPIO) and initialize components within information handling system 100 after a reset of power supply 110. In one embodiment, PCH 130 may receive power from power supply 110 (e.g., via PCH power 210 shown in FIG. 2) after a reset of power supply 110 and may send a signal, or a "PCH signal," to EC 125 indicating that components within information handling system 100 should be initialized, or placed in an operable state. In this embodiment, PCH 130 may receive a signal, or an "EC signal," from EC 125 confirming that the components should be placed in the operable state. Upon receiving the EC signal from EC 125, PCH 130 may cause the components, or a portion thereof, to be placed in the operable state as information handling system 100 completes a booting process. Conversely, PCH 130 may wait for an adjustable threshold period of time, or a "threshold time period," to receive the EC signal from EC 125 and may identify that the threshold time period has elapsed. Upon identifying that the threshold time period has elapsed, PCH 130 may refrain from causing the components, or a portion thereof, to be placed in the operable state. For example, PCH 130 may wait for a threshold time period of 30 seconds to receive the EC signal from EC 125 and may refrain from initializing components upon identifying that the EC signal was not received within the threshold time period. PCH 130 is described in further detail with respect to FIG. 2.

FIG. 2 illustrates selected elements of an embodiment of an information handling system. In the embodiment illustrated in FIG. 2, information handling system 100 includes a lid 105, a power supply 110, a sensor 115, an embedded controller (EC) 125, and a platform controller hub (PCH) 130 as described above with respect to FIG. 1. Information handling system 100 additionally includes a converter 240 (e.g., an AC-DC converter, DC-DC converter, and the like) operable for converting a signal (e.g., a voltage) received by PCH 130. EC 125 includes a memory 220 operable for storing firmware instructions that allow EC 125 to detect, examine, and/or initialize components within, or communicably coupled to, information handling system 100. Similarly, PCH 130 includes a memory 230 operable for storing firmware instructions that allow PCH 130 to manage various data paths and functions associated with information handling system 100 and/or to initialize components within, or communicably coupled to, information handling system 100. As shown in FIG. 2, information handling system 100 additionally includes real-time clock (RTC) power 200 and PCH power 210. Here, power supply 110 may be segmented, or otherwise partitioned, such that a portion of power supply 110 may be provided to RTC power 200 for supplying power to EC 125 and a portion of power supply 110 may be provided to PCH power 210 for supplying power to PCH 130. In other embodiments, information handling system 100 may include additional, fewer, and/or different components than the components shown in FIG. 2.

In one embodiment, EC 125 may receive power from power supply 110 (e.g., via RTC power 200) after a reset of power supply 110 and may cause PCH 130 to receive power from power supply 110 (e.g., via PCH power 210). Specifically, EC 125 may send a signal to converter 240 causing converter 240 to supply power from PCH power 210 to PCH 130. Upon receiving power from PCH power 210 (e.g., via converter 240), PCH 130 may send PCH signal 260 to EC 125 indicating that components of information handling system 100 should be placed in an operable state. For example, PCH 130 may receive power and identify that a register within PCH 130 indicates that information handling system 100 is to transition from a "G3" state in which information handling system 100 is in a mechanically off state to a "G0" state in which information handling system 100 is in a working state. This transition may be prompted by the removal of power supply 110 from information handling system 100 causing a reset of power supply 110 as described above. In one embodiment, PCH signal 260 may be or include a request for EC 125, or for the firmware instructions therein, to cause inoperable components of information handling system 100 to be placed in an "S3" state, or a low wake-up latency sleeping state.

In one embodiment, EC 125 may receive PCH signal 260 and may, instead, delay the initialization of components within information handling system 100 to avoid potential damage to information handling system 100. Specifically, EC 125 may determine that the reset of power supply 110 was caused by power supply 110 being previously removed from information handling system 100. For example, EC 125 may identify that a register within EC 125 indicates that power supply 110 was recently removed, causing information handling system to enter a "G3" state. In addition, EC 125 may determine a position of lid 105. As described above with respect to FIG. 1, the position of lid 105 may be in a closed position while information handling system 100 is oriented in an upside-down orientation allowing a user to perform maintenance on components within information handling system 100. While information handling system 100 is in this orientation, the user is likely unaware of the reset of power supply 110. Therefore, EC 125 may determine the position of lid 105 to ensure that lid 105 is not in a closed position during initialization of components after the removal of power supply 110 causing a reset, likely indicating that the user is performing maintenance. In one embodiment, sensor 115 may determine the position of lid 105 based on magnetic field 280 as described above with respect to FIG. 1. Accordingly, sensor 115 may provide sensor signal 270 to EC 125 and EC 125 may, resultantly, determine the position of lid 105 in relation to information handling system 100.

In one embodiment, upon determining that the reset of power supply 110 was caused by power supply 110 being previously removed from information handling system 100 and that the position of lid 105 is in the closed position, EC 125 may cause components within information handling system 100 to remain in an inoperable state. That is, EC 125 may refrain from sending EC signal 250 to PCH 130 confirming that components should be placed in the operable state. In addition, EC 125 may refrain from causing the components, or a portion thereof, to be placed in the operable state. For example, EC 125 may refrain from placing components of information handling system 100 in an "S3" state. As described above with respect to FIG. 1, PCH 130 may wait for a threshold time period to receive EC signal 250 from EC 125 and may identify that the threshold time period has elapsed. Upon identifying that the threshold time period has elapsed, PCH 130 may refrain from causing the components, or a portion thereof, to be placed in the operable state.

In one embodiment, upon determining that the position of lid 105 has changed from the closed position to an open position, EC 125 may send EC signal 250 to PCH 130 confirming that the components should be placed in the operable state (e.g., "S3" state). Specifically, sensor 115 may determine that the position of lid 105 is in an open position based on an absence of magnetic field 280 and may provide sensor signal 270 to EC 125. Here, sensor signal 270 may indicate that the position of lid 105 is now in the open position. In addition, EC 125 may cause the components, or a portion thereof, to be placed in the operable state. Similarly, PCH 130 may receive EC signal 250 from EC 125 and may cause the components, or a portion thereof, to be placed in the operable state. That is, upon determining that the position of lid 105 has changed from the closed position to the open position, EC 125 and PCH 130 may communicate to respectively cause components of information handling system 100 to be placed in an operable state (e.g., "S5" states, "S3" states, "S0" states, and the like) while information handling system 100 completes a booting process. As such, EC 125 may ensure that components remain in an inoperable state as a user installs and/or uninstalls components while performing maintenance, thereby avoiding potential damage to information handling system 100.

FIG. 3 is a flowchart depicting selected elements of an embodiment of a method for preventing an operable state in a plurality of components of an information handling system in response to a reset of a power supply. It is noted that certain operations described in method 300 may be optional or may be rearranged in different embodiments.

Method 300 may begin at steps 310 and 320, where an embedded controller (EC) of the information handling system may receive power from the power supply and may cause a platform controller hub (PCH) of the information handling system to receive the power from the power supply. For example, power supply 110 may be segmented, or otherwise partitioned, such that a portion of power supply 110 may be provided to RTC power 200 for supplying power to EC 125 and a portion of power supply 110 may be provided to PCH power 210 for supplying power to PCH 130 as described above with respect to FIG. 2. EC 125 may send a signal to converter 240 causing converter 240 to supply power from PCH power 210 to PCH 130 as described above with respect to FIG. 2. In step 330, the EC may receive a PCH signal from the PCH indicating that the plurality of components should be placed in the operable state. The plurality of components may be in an inoperable state. For example, PCH signal 260 may be or include a request for EC 125, or for the firmware instructions therein, to cause inoperable components of information handling system 100 to be placed in an "S3" state, or a low wake-up latency sleeping state, as described above with respect to FIG. 2. In step 340, the EC may determine that the reset of the power supply was caused by the power supply being previously removed from the information handling system. For example, EC 125 may identify that a register within EC 125 indicates that power supply 110 was recently removed, causing information handling system to enter a "G3" state as described above with respect to FIG. 2. In step 350, the EC may determine that a position of a lid of the information handling system is in a closed position. For example, sensor 115 may detect a presence of a magnetic field caused by a magnet within lid 105 and may determine that lid 105 is in a closed position given the presence of the magnetic field as described above with respect to FIG. 1. Sensor 115 may provide sensor signal 270 to EC 125 and EC 125 may, resultantly, determine the position of lid 105 in relation to information handling system 100 as described above with respect to FIG. 2. In step 360, the EC may cause the plurality of components to remain in the inoperable state. For example, upon determining that the reset of power supply 110 was caused by power supply 110 being previously removed from information handling system 100 and that the position of lid 105 is in the closed position, EC 125 may cause components within information handling system 100 to remain in an inoperable state as described above with respect to FIG. 2.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for preventing an operable state in a plurality of components of an information handling system in response to a reset of a power supply, the method comprising:
   receiving, by an embedded controller (EC) of the information handling system, power from the power supply after the reset of the power supply;
   causing, by the EC, a platform controller hub (PCH) of the information handling system to receive the power from the power supply;
   receiving, by the EC, a PCH signal from the PCH indicating that the plurality of components should be placed in the operable state from an inoperable state;
   determining, by the EC, that the reset of the power supply was caused by the power supply being previously removed from the information handling system;
   determining, by the EC, that a position of a lid of the information handling system is in a closed position; and
   causing, by the EC, the plurality of components to remain in the inoperable state.

2. The method of claim 1, further comprising:
   determining, by the EC, that the position of the lid has changed from the closed position to an open position;
   sending, by the EC, an EC signal to the PCH confirming that the plurality of components should be placed in the operable state; and
   causing, by the EC, a first portion of the plurality of components to be placed in the operable state.

3. The method of claim 2, further comprising:
   receiving, by the PCH, the EC signal confirming that the plurality of components should be placed in the operable state; and
   causing, by the PCH, a second portion of the plurality of components to be placed in the operable state.

4. The method of claim 2, wherein determining that the position of the lid has changed from the closed position to the open position comprises:
   receiving, by the EC, a sensor signal from a sensor of the information handling system, the sensor signal indicating that the position of the lid is in the open position.

5. The method of claim 1, wherein causing the plurality of components to remain in the inoperable state comprises:
   refraining, by the EC, from sending an EC signal to the PCH confirming that the plurality of components should be placed in the operable state; and
   refraining, by the EC, from causing a first portion of the plurality of components to be placed in the operable state.

6. The method of claim 5, further comprising:
   waiting, by the PCH, for a threshold time period to receive the EC signal confirming that the plurality of components should be placed in the operable state;
   identifying, by the PCH, that the threshold time period has elapsed; and
   refraining, by the PCH, from causing a second portion of the plurality of components to be placed in the operable state.

7. The method of claim 1, wherein determining that the position of the lid is in the closed position comprises:
   receiving, by the EC, a sensor signal from a sensor of the information handling system, the sensor signal indicating that the position of the lid is in the closed position.

8. An information handling system, comprising:
   at least one processor;
   a lid;
   a power supply;
   a plurality of components;
   a platform controller hub (PCH); and
   an embedded controller (EC) configured to:
      receive power from the power supply after a reset of the power supply;
      cause the PCH to receive power from the power supply;

receive a PCH signal from the PCH indicating that the plurality of components should be placed in an operable state from an inoperable state;

determine that the reset of the power supply was caused by the power supply being previously removed from the information handling system;

determine that a position of the lid is in a closed position; and cause the plurality of components to remain in the inoperable state.

9. The information handling system of claim 8, wherein the information handling system is further configured to:

determine, by the EC, that the position of the lid has changed from the closed position to an open position;

send, by the EC, an EC signal to the PCH confirming that the plurality of components should be placed in the operable state; and cause, by the EC, a first portion of the plurality of components to be placed in the operable state.

10. The information handling system of claim 9, wherein the information handling system is further configured to:

receive, by the PCH, the EC signal confirming that the plurality of components should be placed in the operable state; and cause, by the PCH, a second portion of the plurality of components to be placed in the operable state.

11. The information handling system of claim 9, wherein to determine that the position of the lid has changed from the closed position to the open position, the information handling system is further configured to:

receive, by the EC, a sensor signal from a sensor of the information handling system, the sensor signal indicating that the position of the lid is in the open position.

12. The information handling system of claim 8, wherein to cause the plurality of components to remain in the inoperable state, the information handling system is further configured to:

refrain, by the EC, from sending an EC signal to the PCH confirming that the plurality of components should be placed in the operable state; and refrain, by the EC, from causing a first portion of the plurality of components to be placed in the operable state.

13. The information handling system of claim 12, wherein the information handling system is further configured to:

wait, by the PCH, for a threshold time period to receive the EC signal confirming that the plurality of components should be placed in the operable state;

identify, by the PCH, that the threshold time period has elapsed; and refrain, by the PCH, from causing a second portion of the plurality of components to be placed in the operable state.

14. The information handling system of claim 8, wherein to determine that the position of the lid is in the closed position, the information handling system is further configured to:

receive, by the EC, a sensor signal from a sensor of the information handling system, the sensor signal indicating that the position of the lid is in the closed position.

15. A computing environment, comprising:

an information handling system including one or more processors; and one or more computer-readable non-transitory storage media coupled to one or more of the processors and comprising instructions operable when executed by one or more of the processors to cause the system to:

receive, by an embedded controller (EC) of the information handling system, power from a power supply after a reset of the power supply;

cause, by the EC, a platform controller hub (PCH) of the information handling system to receive the power from the power supply;

receive, by the EC, a PCH signal from the PCH indicating that a plurality of components of the information handling system should be placed in an operable state from an inoperable state;

determine, by the EC, that the reset of the power supply was caused by the power supply being previously removed from the information handling system;

determine, by the EC, that a position of a lid of the information handling system is in a closed position; and cause, by the EC, the plurality of components to remain in the inoperable state.

16. The computing environment of claim 15, wherein the processors are further operable when executed to:

determine, by the EC, that the position of the lid has changed from the closed position to an open position;

send, by the EC, an EC signal to the PCH confirming that the plurality of components should be placed in the operable state; and cause, by the EC, a first portion of the plurality of components to be placed in the operable state.

17. The computing environment of claim 16, wherein the processors are further operable when executed to:

receive, by the PCH, the EC signal confirming that the plurality of components should be placed in the operable state; and cause, by the PCH, a second portion of the plurality of components to be placed in the operable state.

18. The computing environment of claim 16, wherein to determine that the position of the lid has changed from the closed position to the open position, the processors are further operable when executed to:

receive, by the EC, a sensor signal from a sensor of the information handling system, the sensor signal indicating that the position of the lid is in the open position.

19. The computing environment of claim 15, wherein to cause the plurality of components to remain in the inoperable state, the processors are further operable when executed to:

refrain, by the EC, from sending an EC signal to the PCH confirming that the plurality of components should be placed in the operable state; and refrain, by the EC, from causing a first portion of the plurality of components to be placed in the operable state.

20. The computing environment of claim 19, wherein the processors are further operable when executed to:

wait, by the PCH, for a threshold time period to receive the EC signal confirming that the plurality of components should be placed in the operable state;

identify, by the PCH, that the threshold time period has elapsed; and refrain, by the PCH, from causing a second portion of the plurality of components to be placed in the operable state.

\* \* \* \* \*